US008761578B2

(12) United States Patent
Lin

(10) Patent No.: US 8,761,578 B2
(45) Date of Patent: Jun. 24, 2014

(54) METHOD, SYSTEM, AND DEVICE FOR CONTROLLING MEDIA PLAY

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 808 days.

(21) Appl. No.: 13/022,375

(22) Filed: Feb. 7, 2011

(65) Prior Publication Data
US 2011/0129197 A1 Jun. 2, 2011

Related U.S. Application Data

(63) Continuation of application No. PCT/CN2009/072533, filed on Jun. 30, 2009.

(30) Foreign Application Priority Data

Aug. 13, 2008 (CN) .......................... 2008 1 0130813

(51) Int. Cl.
H04N 5/92 (2006.01)
H04N 5/93 (2006.01)

(52) U.S. Cl.
USPC .......................................... 386/248; 386/239

(58) Field of Classification Search
USPC .......... 386/234, 235, 314, 323, 353, 239, 248
See application file for complete search history.

(56) References Cited

U.S. PATENT DOCUMENTS

2007/0092209 A1* 4/2007 Ando et al. ..................... 386/95

FOREIGN PATENT DOCUMENTS

| CN | 1860801 A | 11/2006 |
|---|---|---|
| CN | 1874532 A | 12/2006 |
| CN | 101022545 A | 8/2007 |
| CN | 101132380 A | 2/2008 |
| CN | 101651759 B | 4/2011 |
| WO | WO 03036905 A1 | 5/2003 |

OTHER PUBLICATIONS

International Search Report issued in International Patent Application No. PCT/CN2009/072533, mailed Oct. 22, 2009.
Office Action issued in corresponding Chinese Patent Application No. 200810130813.7, mailed Aug. 3, 2010.
Andreasen et al., "Media Gateway Control Protocol (MGCP), Version 1.0", Network Working Group Cisco Systems, Jan. 2003.
Groves, et al., "Gateway Control Protocol Version 1", Network Working Group Nortel Networks, Jun. 2003.
Chen et al, "Design of a Solid Avalanche Transistor Based on Fast Pulse Generator", Electronic Engineer, vol. 34, No. 4, Apr. 2008.

(Continued)

Primary Examiner — Robert Chevalier
(74) Attorney, Agent, or Firm — Brinks Gilson & Lione

(57) ABSTRACT

The present invention discloses a method, a system, and a device for controlling media play. The method includes: detecting Dual Tone Multi-Frequency (DTMF) input; and exercising media play control for the detected DTMF input according to mapping information between media play control and the DTMF input. The system includes a controlling device and a processing device. The processing device receives the mapping information between media play control and the DTMF input, and learns which media play control operation maps to the DTMF input of the user according to the mapping information between media play control and the DTMF input after detecting the DTMF key codes input by the user. Therefore, the processing device controls media play independently, without involving control operation performed by the controlling device.

19 Claims, 3 Drawing Sheets

(56) References Cited

OTHER PUBLICATIONS

Telecommunication Standardization Sector of ITU, "Series H: Audiovisual and Multimedia Systems; Infrastructure of audiovisual services—Communication procedures". Gateway Control Protocol, Version 2. International Telecommunication Union. H.248.1, v2, Corrigendum 1, Mar. 2004.

Telecommunication Standardization Sector of ITU, "Series H: Audiovisual and Multimedia Systems; Infrastructure of audiovisual services—Communication procedures". Gateway Control Protocol: Version 3.International Telecommunication Union. H.248.1, Amendment 1, May 2008.

* cited by examiner

METHOD, SYSTEM, AND DEVICE FOR CONTROLLING MEDIA PLAY

CROSS-REFERENCE TO RELATED APPLICATIONS

This application is a continuation of International Application No. PCT/CN2009/072533, filed on Jun. 30, 2009, which claims priority to Chinese Patent Application No. 200810130813.7, filed on Aug. 13, 2008, both of which are hereby incorporated by reference in their entireties.

FIELD OF THE INVENTION

The present invention relates to the communication field, and in particular, to a method, a system, and a device for controlling media play.

BACKGROUND

A Media Gateway Controller (MGC) and a Media Gateway (MG) are two key components of a packet-based network in an architecture where the service function is separated from the bearing function. FIG. 1 is a schematic diagram showing the networking of an MGC and MGs. The MGC is responsible for the service control function, and the MG is responsible for the media bearing function. In this way, the service control plane is separated from the media bearer plane, network resources are shared sufficiently, device upgrade and service extension are simplified, and the costs of development and maintenance are slashed.

The main protocol for communication between the MG and the MGC is a gateway control protocol. Currently, two commonly used gateway control protocols are H.248/MeGaCo and Media Gateway Control Protocol (MGCP), and the H.248/MeGaCo is an evolved version of the MGCP. In the H.248 protocol, various resources on the MG are abstractly expressed as terminations. Terminations are categorized into physical termination and ephemeral termination. A physical termination represents a physical entity of a semi-permanent existence nature, for example, Time Division Multiplex (TDM) timeslots; and an ephemeral termination represents a public resource requested temporarily and released after being used, for example, Real-Time Transport Protocol (RTP) streams. A special termination called "root termination" represents the entirety of the MG. A correlation between terminations is abstractly expressed as context. A context may include multiple terminations. Therefore, relations between terminations are depicted by a topology. A termination not correlated with any other termination is included in a special context called "null".

Based on the foregoing abstract connection model, the interactions between the service and the bearer may be regarded as operations for the termination and the context. Such operations are performed through command requests and replies between the MGC and the MG. The types of commands include: Add, Modify, Subtract, Move, Audit Value, Audit Capabilities, Notify, and Service Change. Command parameters, also known as descriptors, are categorized into property, signal, event, and statistic. For convenience, the parameters correlated by a service aggregate into a package logically.

The control exercised by the MGC over the MG may be intended for a termination or streams on the termination. With respect to exercising control over the termination, non-stream features (such as service state and event buffer control) on the termination are included in a termination state descriptor; with respect to exercising control over streams on the termination, stream features on the termination are included in a media descriptor, and a media descriptor may include several stream descriptors. Each stream descriptor is intended for a single stream, and includes a local control descriptor, a local descriptor, and a remote descriptor. A local control descriptor includes stream-related control information, for example, Mode, Reserve Group, and Reserve Value. A local descriptor includes the features of the streams received locally, and a remote descriptor includes the features of the streams received remotely. For example, the features are address, port, coding algorithm, and decoding algorithm, and so on, which are described through a Session Description Protocol (SDP).

Under the control of the MGC, the MG may interact with other devices such as User Agent (UA) representative of the user to distribute information to the user or collect information from the user. In some service scenarios, the MG plays a type of media to the UA under control of the MGC, for example, plays a voice prompt or a Video On Demand (VOD) program. Meanwhile, the user can control the play of the media in a certain mode such as Dual-Tone Multi-Frequency (DTMF), for example, through operations such as play, stop, pause, resume, fast forward, and rewind, which are similar to the operations on a Video Cassette Recorder (VCR). The user input is resolved by the MGC. The user input is received by the MG and the media play is controlled by the MGC. Therefore, the MG generally notifies the user input to the MGC, and the MGC instructs the MG to control the media play. In an actual environment, the control operations such as play, stop, pause, resume, fast forward or rewind in the process of media play do not involve change of the media (namely, do not involve change of media resources). Therefore, if the MG can perform such control operations independently without the interference of the MGC, the control will be more simple and efficient. However, with the MGC being separated from the MG in the current architecture, no solution is disclosed to enable the MG to control media play independently according to the DTMF input of the user.

In the prior art, with a media resource server environment of a split architecture, when the media resource controlling device and the media resource processing device interact with the user to control media play, or when the media control function device and the media delivery function device interact with the user to control media play, no solution is disclosed to enable the media resource processing device or the media delivery function device to control the media play independently according to the DTMF input of the user.

SUMMARY

The embodiments of the present invention provide a method, a system, and a device for control media play in order to enable an MG or a media resource processing device or a media delivery function device to control media play independently according to the DTMF input of the user. The technical solution is as follows:

A method for controlling media play includes:
detecting DTMF input; and
exercising media play control for the detected DTMF input according to mapping information between media play control and the DTMF input.

A system for controlling media play includes:
a controlling device, configured to generate mapping information between media play control and DTMF input, and send the mapping information; and
a processing device, configured to receive the mapping information between media play control and the DTMF input from the controlling device, detect the DTMF input, and exercise media play control for the detected DTMF input according to the mapping information between media play control and the DTMF input.

A processing device includes:

a receiving module, configured to detect DTMF input; and a controlling module, configured to exercise media play control for the DTMF input detected by the receiving module according to mapping information between media play control and the DTMF input.

A controlling device includes:

a generating module, configured to generate mapping information between media play control and DTMF input; and a sending module, configured to send the mapping information generated by the generating module.

The technical solution under the embodiments of the present invention brings the following benefits:

After the mapping information between media play control and the DTMF input is received and the DTMF key codes input by the user are detected, the processing device learns which media play control operation maps to the DTMF input of the user according to the mapping information. Therefore, the processing device controls media play independently, without involving control operation performed by the controlling device, and thus the media play control is simpler and more efficient.

DETAILED DESCRIPTION OF THE EMBODIMENTS

To make the objectives, technical solutions and merits of the present invention more comprehensible, the present invention is described in detail with reference to the accompanying drawings and embodiments as follows.

The method provided in an embodiment of the present invention includes:

detecting DTMF input; and exercising media play control for the detected DTMF input according to mapping information between media play control and the DTMF input.

More specifically, the method includes:

obtaining mapping information between media play control and DTMF input;

receiving the DTMF input; and exercising media play control over the media according to the received DTMF input and the mapping information between media play control and the DTMF input.

The technical solution under the present invention is elaborated below with reference to some exemplary embodiments.

Embodiment 1

In this embodiment, it is assumed that the processing device is an MG, the controlling device is an MGC, and media play control is VCR control of media. In order to enable the MG to control media play independently according to the DTMF input of the user, the gateway control protocol (such as H.248 or MGCP) is extended to accomplish mapping between VCR control and DTMF input. Through this mapping information, the MG learns which VCR control operation maps to the DTMF input of the user, and exercises VCR control over the media independently without involving control exercised by the MGC.

The operations of media play control may include: voice prompt, video play, VOD play, stop, pause, resume, fast forward, and rewind. This embodiment takes "fast forward" operation, "rewind" operation, and the interval skipped by the "fast forward" operation and/or the "rewind" operation as an example.

Figure 1:
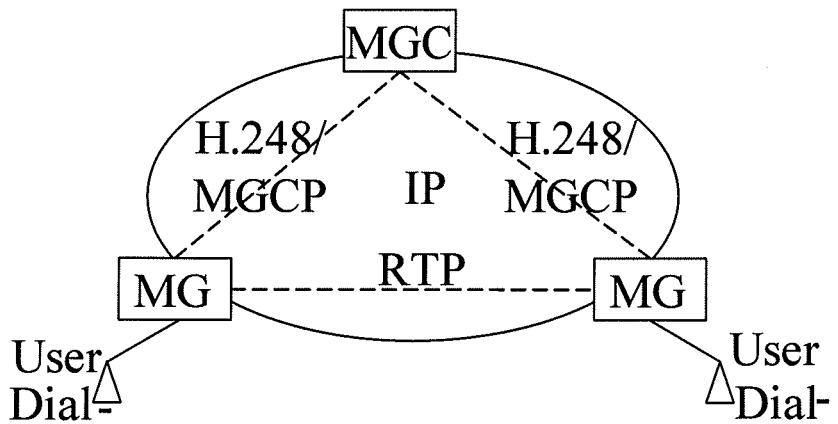
FIG. 1 is a schematic diagram showing the networking of MGs and an MGC in the prior art.
Figure 2:
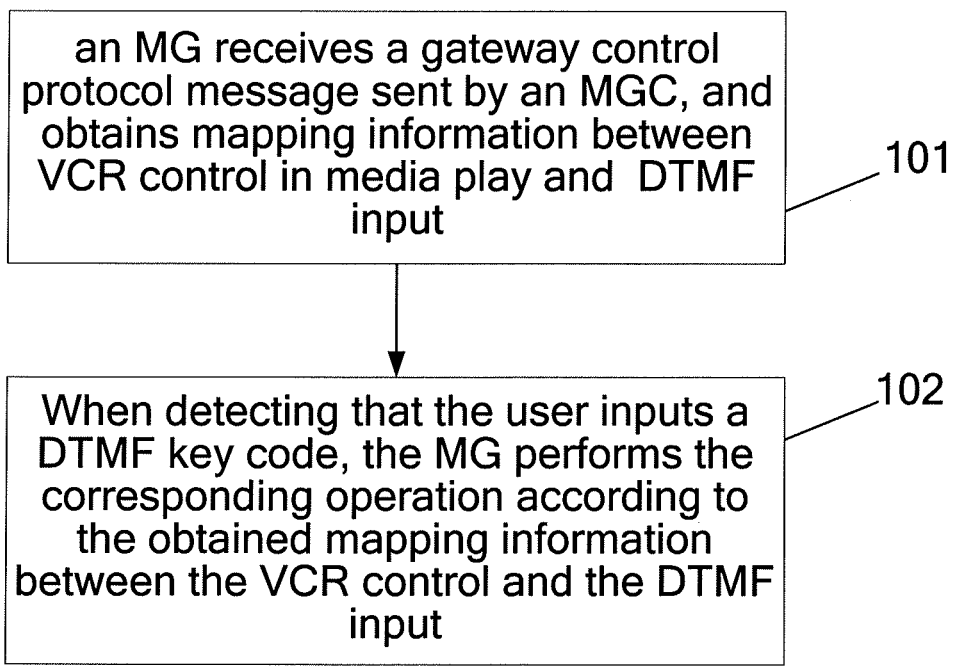
FIG. 2 is a flowchart of a media play control method according to a first embodiment of the present invention.

FIG. 2 is a flowchart of a media play control method according to an embodiment of the present invention. The method includes the following steps:

101. The MG receives a gateway control protocol message sent by the MGC, and obtains mapping information between the VCR control in media play and the DTMF input.

In this embodiment, it is assumed that the gateway control protocol is H.248. The MG receives an H.248 protocol message sent by the MGC. That is, the MGC sets the MG through this protocol message so that the MG obtains the mapping information between the VCR control and the DTMF input.

Specifically, the MGC uses a signal (such as PlayCollect signal) in the H.248 protocol to instruct the MG to play the media content and/or collect the user input. A new parameter may be added in the signal to indicate which DTMF input key code maps to the fast forward control operation in the media play; or a new parameter is added to indicate which DTMF input key code maps to the rewind control operation; or a new parameter is added to indicate the skip interval of the fast forward control operation and/or the rewind control operation. When the MGC sets the DTMF key code corresponding to the fast forward operation, the DTMF key code corresponding to the rewind operation, and the skip interval information for the MG the MGC may respectively deliver such information to the MG as parameters of signals of controlling media play and/or collecting user input, and define names for such parameters according to the H.248 protocol.

For example, a newly added parameter of a PlayCollect signal in the H.248 protocol is named as a Fast Forward Key, which is identified as "ffk", and this ffk parameter represents the fifth DTMF key code corresponding to the fast forward operation; a newly added parameter of a PlayCollect signal in the H.248 protocol is named as a Rewind Key, which is identified as "rwk", and this rwk parameter indicates the sixth DTMF key code corresponding to the rewind operation; and a newly added parameter of a PlayCollect signal is named as a Skip Interval, which is identified as "skint", and this skint parameter represents the skip interval corresponding to the fast forward operation and/or the rewind operation.

The ffk parameter is a string, and its value is the same as the fifth DTMF input key code corresponding to the fast forward control operation. That is, the time interval indicated by the skint parameter is skipped forward when it is detected that the user inputs the DTMF key code.

Likewise, the rwk parameter is a string, and its value is the same as the sixth DTMF input key code corresponding to the rewind control operation. That is, the time interval indicated by the skint parameter is skipped backwards when it is detected that the user inputs the DTMF key code.

The skint parameter is an integer. Its value is the time interval that should be skipped forward or skipped backwards when it is detected that the user inputs the DTMF key code corresponding to the fast forward control operation or the rewind control operation. The time interval may be measured in milliseconds. A default value, such as 6 seconds, may be defined for the time interval. The default value may be defined through a protocol, or preset on the device, or customized by the user. Besides, the skint parameter may be split into two parameters corresponding to the fast forward operation and the rewind operation respectively. For example, the two parameters are named as "Fast Forward Skip Interval" which is identified as "ffskint" and "Rewind Skip Interval" which is identified as "rwskint" respectively. In this case, the ffskint is correlated with the ffk, and the rwskint is correlated with the rwk. The operations of defining and correlating above may be implemented through protocols.

Likewise, new parameters may be added in such a type of signals to indicate the first, the second, the third, and the fourth DTMF input key code respectively corresponding to the play operation, the stop operation, the pause operation and the resume operation in the media play.

It should be noted that, the mode of naming the foregoing parameters is not unique.

102. When detecting that the user inputs a DTMF key code, the MG performs the corresponding operation according to the obtained mapping information between the VCR control and the DTMF input.

Specifically, when the MG detects the DTMF key code input by the user, the MG queries the obtained mapping information between the VCR control and the DTMF input and finds that the DTMF key code input by the user matches the fifth DTMF key code corresponding to the fast forward operation, and therefore, the MG skips forward the amount of the time indicated by the "Skip Interval" parameter. Likewise, when detecting that the DTMF key code input by the user matches the sixth DTMF key code corresponding to the rewind operation in the mapping information, the MG performs the rewind operation. If the MG obtains no skip interval information, the MG performs the fast forward operation or the rewind operation according to the default value.

For example, when the MGC sends a PlayCollect signal to the MQ the ffk parameter of the signal is set to "*a0", the rwk parameter is set to "#b0", and the skint parameter is set to "500". Therefore, when the MG plays the corresponding media, if the MG detects that the user inputs "*a0", the MG plays fast forward for 500 ms; if the MG detects that the user inputs "#b0", the MG rewinds for 500 ms. The DTMF key code input by the user is not unique, and may be "*a0" or another character or digit. Therefore, ffk, rwk, and skint may be set to different values according to different DTMF key codes input by the user in order to meet different user requirements.

It should be noted that, in the H.248 protocol, the ffk parameter is defined to indicate the fifth DTMF key code corresponding to the fast forward operation, the rwk parameter indicates the sixth DTMF key code corresponding to the rewind operation, and the skint parameter indicates the skip interval. Such parameters may be set when the MGC delivers the parameters to the MG. When the user inputs the DTMF key codes corresponding to different operations, the MG can execute the corresponding operation according to the mapping relation indicated by such parameters. In practice, the user may agree with the MGC beforehand on which DTMF key code maps to which VCR control operation.

The fast forward operation and the rewind operation are limited to the beginning and the end of the played media. That is, the offset generated by the skint parameter cannot exceed the range of the played media. If the rewind operation makes the offset exceed the beginning of the played media, the play of the media will start from the beginning. Likewise, if the fast forward operation makes the offset exceed the end of the played media, the play of the media is regarded as finished. The MG may judge whether the offset generated by the skint parameter exceeds the range of the played media itself, for example, by affixing a timestamp on the media or calculating the duration of playing the media.

In this embodiment, the MGC sends an H.248 protocol message to the MG, and sets the MG according to the parameters of the signals defined in this protocol. In this way, the MG obtains the mapping information between the VCR control in the media play and the DTMF input. According to this mapping information, the MG judges the VCR operation indicated by the DTMF key code input by the user, and controls the media play.

It should be noted that, the controlling device in this embodiment may be an MGC or another device such as a Network Management System (NMS). Such other device sends the mapping information between VCR control in the media play and the DTMF input to the MG directly.

It should be noted that, in this embodiment, it is possible that the MGC sends the mapping information between the VCR control in the media play and the DTMF input to the MG, or the mapping information between the VCR control in the media play and the DTMF input is set on the MG directly, for example, the mapping information is preset on the MG in the manufacturing process.

The media play control method provided in this embodiment is applicable to an MGC-MG environment, or a media resource server environment of a similar split architecture, namely, an environment where the media resource controlling device is separated from the media resource processing device, or an environment where the media control function device is separated from the media delivery function device. In a media resource server environment, the media resource controlling device or the media control function device is similar to an MGC, and the media resource processing device or the media delivery function device is similar to an MG; and the communication between the media resource controlling device and the media resource processing device, and the communication between the media control function device and the media delivery function device may be implemented through a gateway control protocol. Besides, in a media resource server environment, the mapping information between the VCR control in the media play and the DTMF input may also be sent by another controlling device such as an NMS to the media resource processing device or the media delivery function device.

Embodiment 2

Figure 3:
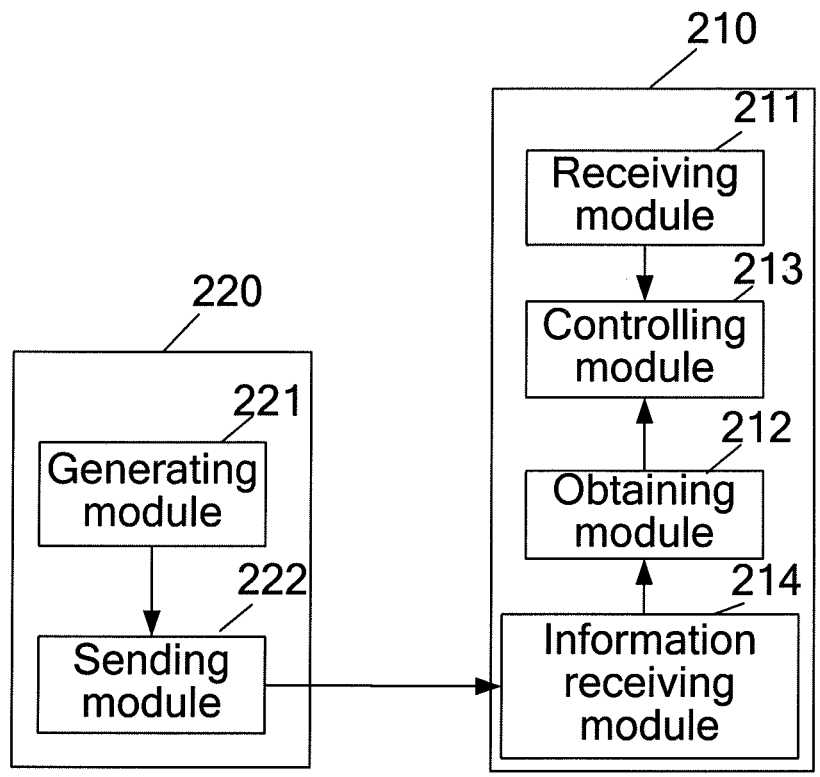
FIG. 3 shows a structure of a media play control system according to a second embodiment of the present invention.

As shown in FIG. 3, a media play control system is provided in this embodiment. The system includes a processing device 210 and a controlling device 220:

the controlling device 220, configured to generate mapping information between media play control and DTMF input, and send the mapping information; and the processing device 210, configured to obtain the mapping information between media play control and the DTMF input, and receive the DTMF input; and exercise media play control over the media according to the received DTMF input and the mapping information between media play control and the DTMF input.

The processing device 210 includes a receiving module 211, an obtaining module 212 and a controlling module 213:

the receiving module 211, configured to receive DTMF input, where the receiving of the DTMF input may also be understood as detecting of the DTMF input;

the obtaining module 212, configured to obtain the mapping information between media play control and the DTMF input; and the controlling module 213, configured to exercise media play control over the media according to the DTMF input received by the receiving module 211 and the mapping information between media play control and the DTMF input obtained by the obtaining module 212.

The processing device 210 may further include an information receiving module 214, which is configured to receive information sent by the controlling device 220, where the information includes mapping information between media play control and the DTMF input.

Accordingly, the obtaining module 212 obtains the mapping information between media play control and the DTMF input from the receiving module 214.

Alternatively, the processing device 220 may further include a setting module. The setting module stores preset information first. The preset information includes the mapping information between media play control and the DTMF input. The setting module sets the processing device 210 according to the mapping information.

The controlling device 220 includes a generating module 221 and a sending module 222:

the generating module 221, configured to generate mapping information between media play control and DTMF input; and the sending module 222, configured to send the mapping information generated by the generating module 221.

Depending on the actual application environment, the processing device in this embodiment may be an MQ or a media resource processing device, or a media delivery function device; the controlling device in this embodiment may be an MGC, or a media resource controlling device, or a media control function device.

Specifically, when the controlling device 220 is an MGC and the processing device 210 is an MQ the mapping information between the VCR control and the DTMF input (for example, which DTMF key code maps to the fast forward operation, which DTMF key code maps to the rewind operation, and skip interval information) may be delivered by the MGC to the MG as parameters of signals of controlling media play and/or collecting user input. The parameters of the signals may be named according to the H.248 protocol, and the MGC sends the parameters to the MG through an H.248 protocol message.

In this embodiment, the processing device receives the information delivered by the controlling device, or the processing device is preset in the manufacturing process. In this way, the processing device obtains the mapping information between media play control and the DTMF input, and exercises control over the media according to the mapping information.

Embodiment 3

Figure 4:
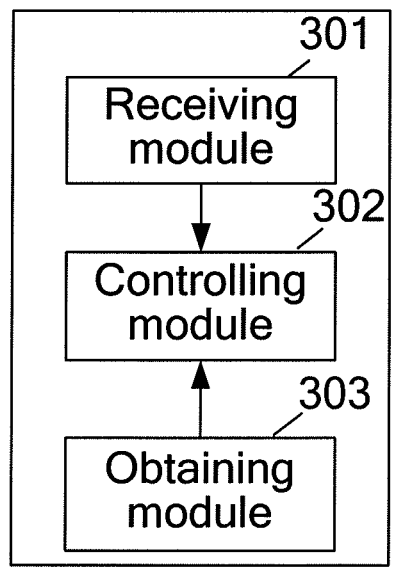
FIG. 4 shows a structure of a processing device according to a third embodiment of the present invention.

As shown in FIG. 4, a processing device is provided in this embodiment. The processing device includes:

a receiving module 301, configured to detect DTMF input; and a controlling module 302, configured to exercise media play control for the DTMF input detected by the receiving module 301 according to mapping information between media play control and the DTMF input.

The processing device further includes:

an obtaining module 303, configured to obtain the mapping information between media play control and the DTMF input.

The obtaining module 303 includes:

a first obtaining unit, configured to receive information which includes the mapping information between media play control and the DTMF input; or a second obtaining unit, configured to obtain the mapping information between media play control and the DTMF input through presetting.

The controlling module 302 includes:

a judging unit, configured to judge which media play control operation maps to the DTMF input of the user according to the mapping information between media play control and the DTMF input, where the mapping information is obtained by the obtaining module; and a controlling unit, configured to control media play according to media play control operation judged by the judging unit.

The processing device is an MG or a media resource processing device, or a media delivery function device.

The processing device in this embodiment receives the information that includes the mapping information between media play control and the DTMF input, or the processing device is preset in the manufacturing process. Therefore, the processing device exercises control over the media according to the mapping information between media play control and the DTMF input.

Embodiment 4

Figure 5:
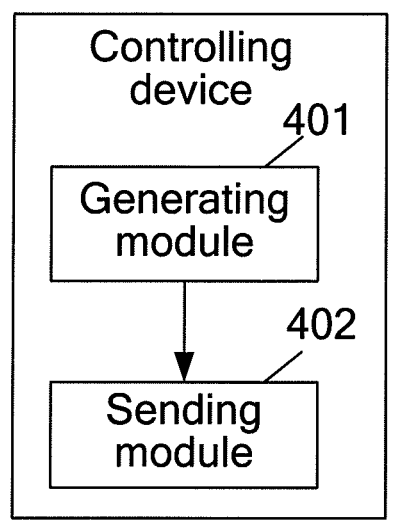
FIG. 5 shows a structure of a controlling device according to a fourth embodiment of the present invention.

As shown in FIG. 5, a controlling device is provided in this embodiment. The controlling device includes:

a generating module 401, configured to generate mapping information between media play control and DTMF input; and a sending module 402, configured to send the mapping information generated by the generating module 401.

The controlling device is an MGC, or a media resource controlling device, or a media control function device.

The controlling device provided in this embodiment generates and sends the mapping information between media play control and the DTMF input, the device that receives the mapping information controls the media play according to the mapping information between media play control and the DTMF input. Therefore, the controlling device does not need to participate in controlling the media play, and media play control is simpler and more efficient.

It should be noted that, in this embodiment, the word "obtaining" refers to obtaining information from another module actively or receiving information sent by another module.

In this embodiment, the processing device receives the mapping information between media play control and the DTMF input, or the mapping information is set on the processing device directly; after detecting the DTMF key codes input by the user, the processing device learns which media play control operation maps to the DTMF input of the user according to the mapping information. Therefore, the processing device controls media play independently, without involving any control operation performed by the controlling device; and media play control is simpler and more efficient.

The embodiments of the present invention may be implemented through software, and the software may be stored in a readable storage medium such as computer hard disk, floppy disk, or CD-ROM.

The above descriptions are merely some exemplary embodiments of the present invention, but are not intended to limit the scope of the present invention. Any modifications, variations or replacement that can be easily derived by those skilled in the art without departing from the spirit and scope of the invention shall fall within the protection scope of the present invention.

What is claimed is:

1. A method for controlling media play, comprising:
   detecting a Dual Tone Multi-Frequency (DTMF) input; and
   controlling media play control for the detected DTMF input according to mapping information between a media play control and the DTMF input.

2. The method according to claim 1, further comprising:
   obtaining the mapping information between the media play control and the DTMF input by
   receiving information that comprises the mapping information between the media play control and the DTMF input.

3. The method according to claim 1, wherein: controlling media play control for the detected DTMF input according to the mapping information between the media play control and the DTMF input comprises: learning which media play control operation maps to the DTMF input of a user according to the mapping information between the media play control and the DTMF input, and controlling media play for the detected DTMF input.

4. The method according to claim 1, wherein:
   the media play control is a Video Cassette Recorder (VCR) control.

5. The method according to claim 4, wherein the mapping information between media play control and the DTMF input comprises at least one of the following:
   a play operation in the VCR control and a first DTMF key code corresponding to the play operation;
   a stop operation in the VCR control and a second DTMF key code corresponding to the stop operation;
   a pause operation in the VCR control and a third DTMF key code corresponding to the pause operation;
   a resume operation in the VCR control and a fourth DTMF key code corresponding to the resume operation;
   a fast forward operation in the VCR control and a fifth DTMF key code corresponding to the fast forward operation; and
   a rewind operation in the VCR control and a sixth DTMF key code corresponding to the rewind operation.

6. The method according to claim 5, wherein:
   when the mapping information comprises the fifth DTMF key code corresponding to the fast forward operation and/or the sixth DTMF key code corresponding to the rewind operation, the mapping information further comprises:
   a skip interval simultaneously applicable to the fast forward operation and the rewind operation.

7. The method according to claim 5, wherein:
   when the mapping information comprises the fifth DTMF key code corresponding to the fast forward operation and/or the sixth DTMF key code corresponding to the rewind operation, the mapping information further comprises at least one of the following:
   a first skip interval applicable to the fast forward operation and a second skip interval applicable to the rewind operation.

8. The method according to claim 5, wherein:
   the mapping information between the VCR control and the DTMF input is indicated by parameters of signals in a gateway control protocol, wherein the signals indicate one of the following: control of media play and collection of user input.

9. The method according to claim 1, wherein, a new parameter is added in a signal in a gateway control protocol to indicate at least one of the following:
   which DTMF input maps to fast forward control operation;
   which DTMF input maps to rewind control operation; and
   skip interval of the fast forward control operation and/or the rewind control operation.

10. The method according to claim 2, wherein controlling, media play for the detected DTMF input according to the mapping information between media play control and the DTMF input comprises:
    querying, by a Media Gateway (MG), the obtained mapping information between media play control and the DTMF input,
    finding, by the MG, that the DTMF input by a user maps to fast forward operation,
    skipping forward, by the MG, amount of time indicated by a parameter in a signal in a gateway control protocol.

11. The method according to claim 2, wherein controlling, media play for the detected DTMF input according to the mapping information between media play control and the DTMF input comprises:
    querying, by a Media Gateway (MG), the obtained mapping information between media play control and the DTMF input;
    finding, by the MG, that the DTMF input by a user maps to rewind operation;
    rewinding, by the MG, amount of time indicated by a parameter in a signal in a gateway control protocol.

12. The method according to claim 1, further comprising:
    obtaining the mapping information between the media play control and the DTMF input by
    presetting the mapping information between media play control and the DTMF input.

13. A system for controlling media play, comprising:
    a controlling device, configured to generate mapping information between media play control and Dual Tone Multi-Frequency (DTMF) input, and send the mapping information; and
    a processing device, configured to receive the mapping information between media play control and the DTMF input from the controlling device, detect the DTMF input, and exercise media play control for the detected DTMF input according to the mapping information between media play control and the DTMF input.

14. A processing device, comprising:
    a receiving module, configured to detect Dual Tone Multi-Frequency (DTMF) input; and
    a controlling module, configured to control media play for the DTMF input detected by the receiving module according to mapping information between media play control and the DTMF input.

15. The processing device according to claim 14, further comprising:
    an obtaining module, configured to obtain the mapping information between the media play control and the DTMF input;
    the obtaining module comprises:
    a first obtaining unit, configured to receive information which comprises the mapping information between media play control and the DTMF input; and
    a second obtaining unit, configured to obtain the mapping information between media play control and the DTMF input through presetting.

16. The processing device according to claim 14, wherein the controlling module comprises:
- a judging unit, configured to determine which media play control operation maps to the DTMF input of a user according to the mapping information between media play control and the DTMF input, wherein the mapping information is obtained by the obtaining module; and
- a controlling unit, configured to control media play according to the media play control operation judged determined by the judging unit.

17. The processing device according to claim 14, wherein the processing device is one of the following:
- a Media Gateway (MG);
- a media resource processing device; and
- a media delivery function device.

18. A controlling device, comprising:
- a generating module, configured to generate mapping information between media play control and Dual Tone Multi-Frequency (DTMF) input; and
- a sending module, configured to send the mapping information generated by the generating module.

19. The controlling device according to claim 18, wherein the controlling device is one of the following:
- a Media Gateway Controller (MGC);
    - is a media resource controlling device; and
        - a media control function device.

* * * * *